Mauck & McGahey,
Corn Harvester.

No. 618 Reissued Nov. 2, 1858

UNITED STATES PATENT OFFICE.

R. C. MAUCK, OF CONRAD'S STORE, AND W. T. McGAHEY, OF McGAHEYSVILLE, VIRGINIA.

IMPROVEMENT IN CORN-HARVESTERS.

Specification forming part of Letters Patent No. 14,730, dated April 22, 1856; Reissue No. 618, dated November 2, 1858.

*To all whom it may concern:*

Be it known that we, R. C. MAUCK and W. T. McGAHEY, the former of Conrad's Store, and the latter of McGaheysville, Rockingham county, Virginia, have invented a new and useful Improvement in Corn-Harvesters; and we do hereby declare that the following is a full, clear, and exact description of the construction and operation of the same, reference being had to the annexed drawings, forming part of this specification, in which—

Figure 1:
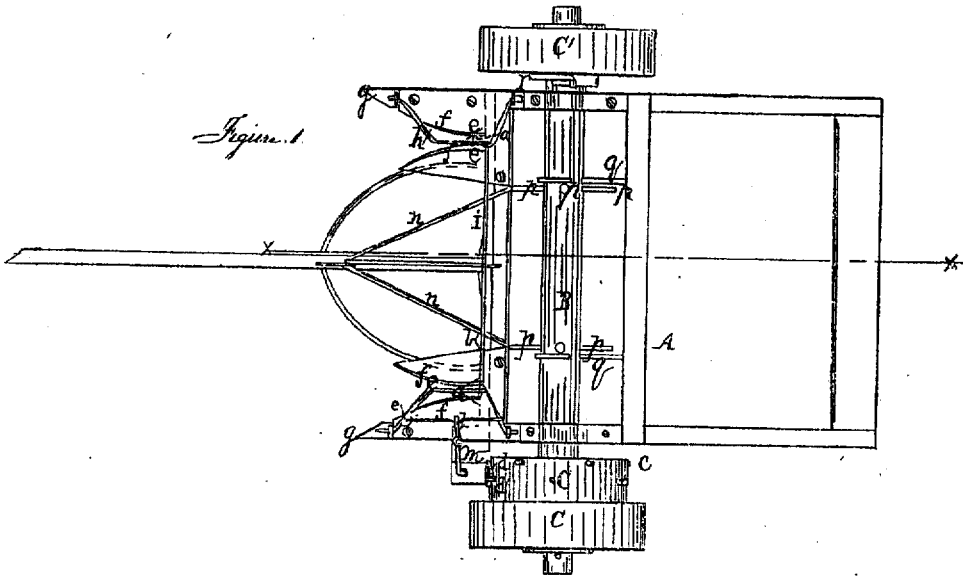
Figure 2:
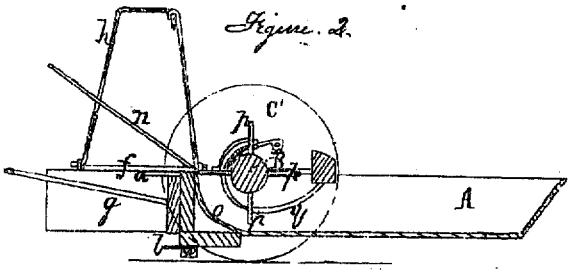
Figure 3:
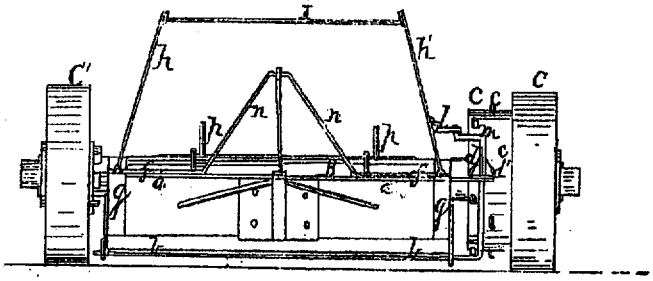

Figure 1 is a top view of the harvester. Fig. 2 is a vertical section on line *x x*. Fig. 3 is a front view.

Similar letters of reference denote the same part of the harvester.

The object of our invention is the gathering of Indian corn on the stalk for depositing in shocks, and is designed to cut the stalk, deliver it across the machine, deposit it in the receiver, and cut the stump near the surface of the ground.

The invention consists in constructing in front of the machine a double series of cutters, operated from the rotation of one of the wheels, for the purpose of cutting the stalk and removing the stumps, and in constructing above the upper cutters frames oscillated by the vibration of said cutters for throwing the cut stalk across the machine upon an inclined guide leading to the body of the machine, where radial arms of the main shaft seize the stalk and convey it to the rear of the body, the details of construction and operation being as follows:

In the drawings, A is the body of the machine, supported so as to run close to the surface of the ground upon the main axle B, upon which are the wheels C C′.

In front of the machine are the two series of cutters *a* and *b*, operated simultaneously from the rotation of the wheels C by the alternate action of the pins *c* upon the opposite inclined blades, *d d′*, connected with the cutter-bars, or by any of the usual methods of producing the reciprocation of the cutter-bar from the rotation of the driving-wheel. The upper cutters, *a*, which are the ordinary triangular cutters, vibrate beneath and in contact with the stalk-receivers *f*, whose edges *e* are sharpened, so that a shear cut is made between them and cutter *a*. We do not design, however, to restrict ourselves to this construction of cutter. The lower cutters, *b*, are also triangular, and by their reciprocation sever the stumps with which they come in contact.

Hinged upon the upper edges of the projecting side pieces, *g*, are the frames *h h′*, connected by the rod *i*, and oscillated laterally by reason of connection *l* with bar *m* of cutters. Extending obliquely forward from the front of the body is the guide *n′*, which submits the stalk to the arms of the main shaft B. The front of the body has a curved interior, *o*, so that arms *p* of the shaft will carry the stalk under the guides *g*, whence it is forced to the rear of the body, as will be set forth. The wheel C′ is placed loosely upon the shaft, and has a ratchet-and-pawl connection, *r*, so that in backing the wheel C′ will turn loosely, and not act on the shaft.

The operation of the harvester is as follows: It is driven forward, so that one of the stalk-receivers *f* will embrace each stalk of a row as it comes in contact with the said stalks, each stalk passing to the narrow portion of the said receiver and being severed by the cutter *a*, working under the receiver in operation. As the stalk is cut the vibrating frame *h* (or *h′*, depending on the cutter in operation) throws it upon the inclined guide *n* across the machine, whence it falls within the action of the arms *p*, which convey it to the rear of the body under guides *q*. Simultaneously with the cutting of the stalks by the cutter *a* the cutters *b* sever the stumps from the ground and permit the passage of the machine. When the stalks of one row are all gathered the machine is turned and driven across the field in the opposite direction, bringing the other receiver *f* and cutter *a* in action to gather the next row of corn. In this manner the operation is continued, each side of the machine being brought into operation alternately, the loads being deposited for shocking at suitable intervals.

What we claim as new and of our own in-vention, and desire to secure by Letters Patent, is—

1. The rotary arms *p*, in combination with eccentric guides *q*, substantially in the manner and for the purpose specified.

2. The employment of a double series of cutters for cutting stalk and stump, as described.

In testimony whereof we have hereunto signed our names before two subscribing witnesses.

R. C. MAUCK.
W. T. McGAHEY.

Witnesses:
W. CROPFIELD,
JOHN S. HOLLINGSHEAD.